(12) United States Patent
Nakaya et al.

(10) Patent No.: US 12,723,661 B2
(45) Date of Patent: Sep. 1, 2026

(54) FLOW CONTROL VALVE

(71) Applicant: AISAN KOGYO KABUSHIKI KAISHA, Obu (JP)

(72) Inventors: Keiji Nakaya, Nisshin (JP); Shinji Murai, Obu (JP); Yasuhiro Tsuzuki, Chita-gun (JP)

(73) Assignee: AISAN KOGYO KABUSHIKI KAISHA, Obu (JP)

(*) Notice: Subject to any disclaimer, the term of this patent is extended or adjusted under 35 U.S.C. 154(b) by 31 days.

(21) Appl. No.: 18/928,946

(22) Filed: Oct. 28, 2024

(65) Prior Publication Data

US 2025/0172211 A1 May 29, 2025

(30) Foreign Application Priority Data

Nov. 27, 2023 (JP) ................................ 2023-199672

(51) Int. Cl.
*F16K 1/36* (2006.01)
*F16K 1/46* (2006.01)
*F16K 27/02* (2006.01)

(52) U.S. Cl.
CPC ................ *F16K 1/36* (2013.01); *F16K 1/465* (2013.01); *F16K 27/0236* (2013.01)

(58) Field of Classification Search
CPC ........ F16K 1/36; F16K 1/465; F16K 27/0236; F16K 1/46; F16K 17/196; F02M 25/08; F02M 26/67
USPC ........................................ 277/349, 351, 353
See application file for complete search history.

(56) References Cited

U.S. PATENT DOCUMENTS 8,037,897 B2 * 10/2011 McIntire ............... F04B 53/102 137/902
11,306,686 B2 * 4/2022 Makino ............. F02M 25/0836
2003/0079776 A1 * 5/2003 Ishitoya .................... F16K 1/46 137/202
2007/0284829 A1 * 12/2007 Matsui ................. F16J 15/3264 277/349

(Continued)

FOREIGN PATENT DOCUMENTS

GB 261325 A * 11/1926 ............... F16K 1/46
JP H0632834 U 4/1994
JP 3147827 B2 3/2001

(Continued)

OTHER PUBLICATIONS

WO2011029849 Translation (Year: 2026).*

*Primary Examiner* — Jessica Cahill
(74) *Attorney, Agent, or Firm* — CONLEY ROSE, P.C.

(57) ABSTRACT

A flow control valve includes a valve seat, a valve plug movable relatively to the valve seat between a valve open position and a valve closed position, and a seal member interposed between the valve seat and the valve plug. The seal member includes a base portion attached to one of the valve seat and the valve plug, and a seal lip having a circular truncated cone shape and protruding obliquely inward in the axial direction from a surface of the base portion. The seal lip separates from or elastically contacts the other of the valve seat and the valve plug depending on the position of the valve plug. The base portion has a circular recess extending continuously in a circumferential direction and having an inner surface continuous with an inner circumferential surface of the seal lip.

2 Claims, 8 Drawing Sheets

(56) References Cited

U.S. PATENT DOCUMENTS

2016/0186697 A1 * 6/2016 Tsuzuki ............... F02M 25/089
123/519

FOREIGN PATENT DOCUMENTS

| | | | | | |
|---|---|---|---|---|---|
| JP | 2005226325 | A | | 8/2005 | |
| JP | 2013107610 | A | | 6/2013 | |
| JP | 2016121791 | A | | 7/2016 | |
| JP | 2016151282 | A | | 8/2016 | |
| JP | 2019211019 | A | * | 12/2019 | |
| WO | WO-2011029849 | A1 | * | 3/2011 | ............... F16K 1/46 |
| WO | WO-2016103806 | A1 | * | 6/2016 | ........... F02M 25/089 |

* cited by examiner

FLOW CONTROL VALVE

CROSS-REFERENCE TO RELATED APPLICATIONS

This application claims priority to Japanese patent application serial number 2023-199672 filed Nov. 27, 2023, which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to flow control valves.

One type of fuel vapor emission control systems includes a positive pressure relief valve and a negative pressure relief valve to control the pressure in the closed fuel tank at the proper pressure value. The positive pressure relief valve is configured to open when the pressure in the fuel tank is above a predetermined positive pressure value. The negative pressure relief valve is configured to open when the pressure in the fuel tank is below a predetermined negative pressure value. The flow control valve of the present disclosure corresponds to the positive pressure relief valve.

FIG. 9 is a cross-sectional view of a seal member for an existing flow control valve. As shown in FIG. 9, an annular seal member 170 made of an elastic material seals between a valve member 151 and a valve seat (not shown) when the valve member 151 is closed, i.e., seats on the valve seat. The seal member 170 has an annular plate-shaped base portion 172 attached to the valve member 151 and a seal lip 173 having a circular truncated cone shape. More precisely, the seal lip 173 protrudes obliquely inward in the axial direction from the lower surface of the base portion 172. The seal lip 173 has a wall thickness 173T, a lip angle 173θ, a lip center length 173L, and a forcible ejection width 173W, which are substantially constant throughout the entire circumference of the seal lip 173.

The inner space of the seal lip 173 corresponds to an undercut portion 173U during the molding of the seal member 170 of the flow control valve such that the seal lip 173 is forcibly deformed and pulled to be released from the mold. Accordingly, during the mold release, the seal lip 173 is prone to molding defects such as tearing or lack of wall thickness causing poor mold releasability. Therefore, there has been a need for improved fuel control valves.

SUMMARY

In one aspect of the present disclosure, a flow control valve includes a housing defining a fluid passage, a valve seat having a ring shape and disposed in the housing, a valve plug movable relatively to the valve seat between a valve open position and a valve closed position in an axial direction of the valve seat, and a seal member interposed between the valve seat and the valve plug. The seal member has a ring shape and is configured to seal between the valve seat and the valve plug when the valve plug is in the valve closed position. The seal member includes an annular base portion attached to one of the valve seat and the valve plug, and a seal lip having a circular truncated cone shape and protruding obliquely inward in the axial direction from a surface of the base portion. The seal lip is separated from the other of the valve seat and the valve plug when the valve plug is in the valve open position and is configured to elastically contact the other of the valve seat and the valve plug when the valve plug is in the valve closed position. The surface of the base portion has a circular recess extending continuously in a circumferential direction. The recess has an inner surface continuous with an inner circumferential surface of the seal lip.

DETAILED DESCRIPTION

One embodiment of the present disclosure is described below in reference to the drawings. A flow control valve of the present embodiment is a positive pressure relief valve of a relief valve device of a fuel vapor emission control system that is mountable on a vehicle such as an automobile equipped with an internal combustion engine. Thus, an overview of the fuel vapor emission control system will be described before the positive pressure relief valve along with the relief valve device.

Figure 1:
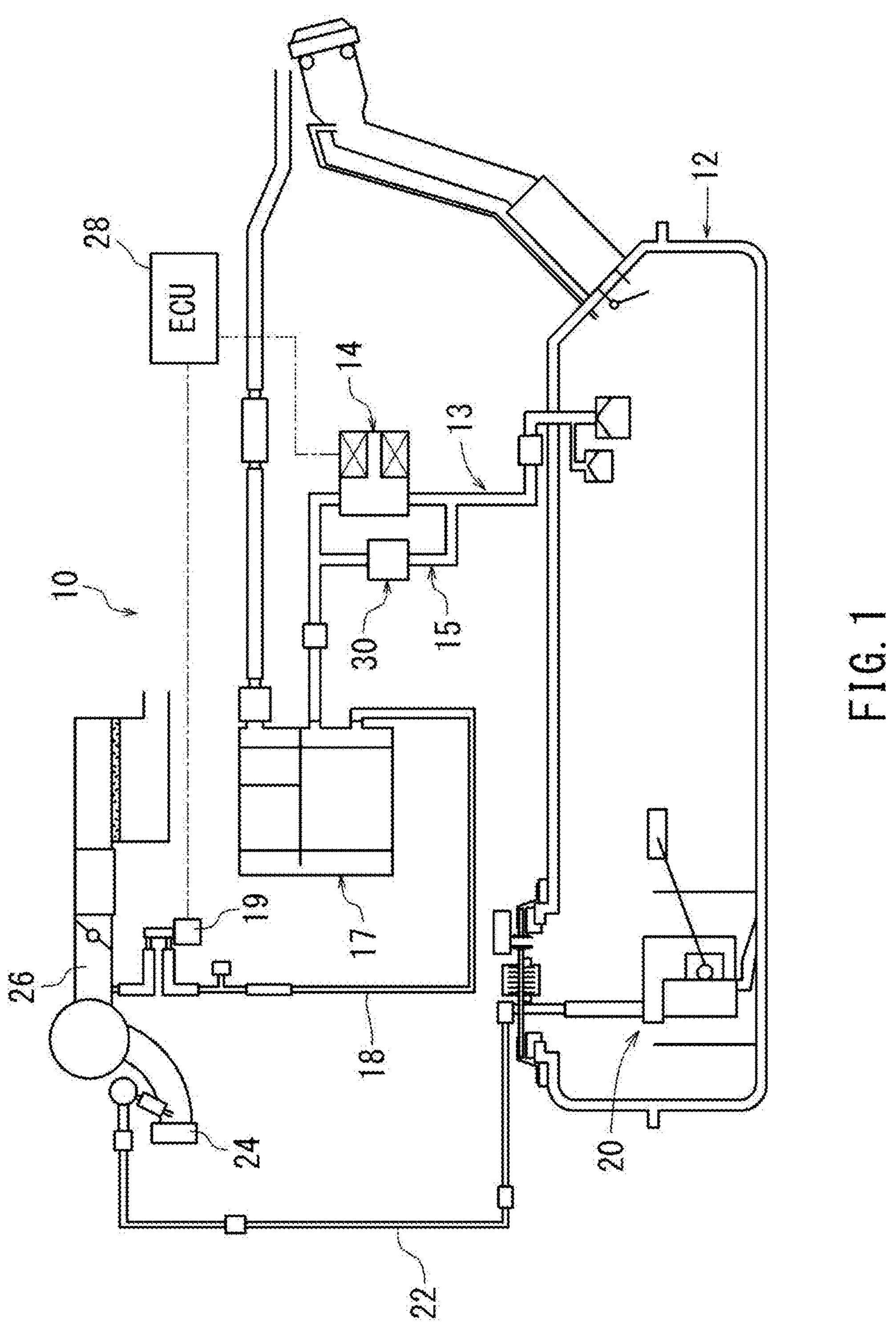
FIG. 1 is a schematic view of an embodiment of a fuel vapor emission control system having a relief valve device.

FIG. 1 is a schematic view of a fuel vapor emission control system 10. As shown in FIG. 1, the fuel vapor emission control system 10 includes a fuel tank 12, a canister 17 filled with an adsorbent such as activated carbon, and a vapor passage 13 connecting the fuel tank 12 to the canister 17. The fuel vapor evaporated in the fuel tank 12 flows through the vapor passage 13 toward the canister 17 and then is adsorbed on the adsorbent in the canister 17. The valve passage 13 includes a sealing valve 14 that has an electrically operated open/close valve. The vapor passage 13 has a bypass passage 15 that bypasses the sealing valve 14. The bypass passage 15 has a relief valve device 30. A fuel supply device 20 delivers fuel from the fuel tank 12 to the internal combustion engine (engine) 24 through a fuel supply path 22.

A purge passage 18 connects the canister 17 to an intake passage 26 of the engine 24. The purge passage 18 includes a purge valve 19. When the purge valve 19 is opened at a predetermined time during operation of the engine 24, the intake air negative pressure of the engine 24 is applied to the canister 17 to supply the fuel vapor from the canister 17 through the purge passage 18 to the intake passage 26. An electronic control unit (hereinafter referred to as "ECU") 28 controls the opening and closing of the sealing valve 14 and the purge valve 19.

While the vehicle is parked, in other words, the sealing valve 14 is closed to block the vapor passage 13 such that the fuel vapor in the fuel tank 12 does not flow into the canister 17. During refueling, the sealing valve 14 is opened to connect the fuel tank 12 to the canister 17 via the vapor passage 13 for the fluid to flow through. The fuel vapor flows from the fuel tank 12 to the canister 17 through the vapor passage 13 and then is adsorbed on the adsorbent in the canister 17. When the sealing valve 14 is closed during parking or the like, the relief valve device 30 controls the pressure in the fuel tank 12 at the proper pressure value.

Figure 2:
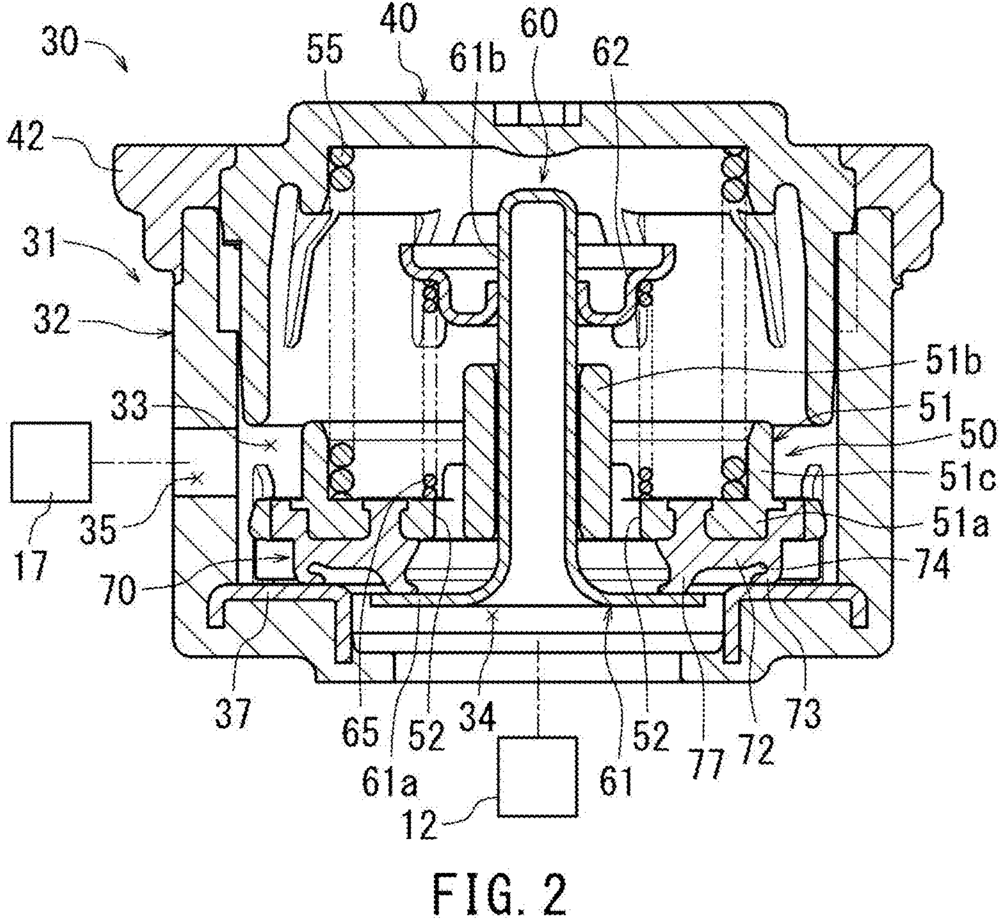
FIG. 2 is a cross-sectional view of the relief valve device of FIG. 1.

FIG. 2 is a cross-sectional view of the relief valve device 30. The vertical and horizontal directions with respect to the relief valve device 30 are defined based on FIG. 2, but the directions do not limit an arrangement direction of the relief valve device 30. As shown in FIG. 2, the relief valve device 30 has a housing 31, a positive pressure relief valve 50, and a negative pressure relief valve 60. The relief valve device 30 may be arranged such that the axial direction is oriented in the vertical direction with respect to the vehicle.

The housing 31 includes a housing body 32, a cover 40, and a retaining member 42. The interior space of the housing 31 is a passage 33 for fluid. The housing body 32 is formed of a resin material and has a bottomed cylindrical shape. The center of the bottom wall of the housing body 32 has a first connecting port 34, which fluidly connects with the passage 33. The side wall of the housing body 32 has a second connecting port 35, which connects the passage 33 for the fluid to flow through.

The first connecting port 34 connects to the fuel tank 12 via the bypass passage 15 and the vapor passage 13 on the fuel tank 12 side of the fuel vapor emission control system 10 (see FIG. 1). The second connecting port 35 connects to the canister 17 via the bypass passage 15 and the vapor passage 13 on the canister 17 side of the fuel vapor emission control system 10 (see FIG. 1).

As shown in FIG. 2, an annular plate-shaped valve seat 37 is coaxially disposed on the bottom wall of the housing body 32. The valve seat 37 is made of metal and is integrated with the bottom wall by insert molding.

The cover 40 is made of a resin material and has a cap shape as a hollow cylindrical shape with a closed top end. The cover 40 closes an upper opening of the housing body 32. The retaining member 42 is made of a resin material and has a ring shape. The retaining member 42 is fastened to the upper end of the side wall of the housing body 32 and the outer circumference of the cover 40 by welding or the like.

The positive pressure relief valve 50 is coaxially installed in the housing 31. The positive pressure relief valve 50 moves relative to the valve seat 37 in the axial direction, i.e., the vertical direction to be open and closed. The positive pressure relief valve 50 is normally closed. The positive pressure relief valve 50 opens when the pressure on the first connecting port 34 side, i.e., the fuel tank 12 side, exceeds the valve opening pressure value for the positive pressure. In FIG. 2, the positive pressure relief valve 50 and the negative pressure relief valve 60 are closed. The positive pressure relief valve 50 is also referred to the "flow control valve" herein.

The positive pressure relief valve 50 includes a first valve plug 51 that is arranged in the housing 31 and is movable in the axial direction. The first valve plug 51 has a first valve plate portion 51*a*, a shaft portion 51*b*, and a cylinder portion 51*c*. The first valve plate portion 51*a* has an annular plate shape. The shaft portion 51*b* and the cylinder portion 51*c* are formed coaxially on the first valve plate portion 51*a* and form a bicylindrical shape.

The first valve plate portion 51*a* has an outer diameter smaller than the inner diameter of the side wall of the housing body 32. The first valve plate portion 51*a* has an outer diameter larger than the outer diameter of the cylinder portion 51*c*. When the first valve plug 51 is in a valve closed position, the outer circumferential portion of the first valve plate portion 51*a* seats on the valve seat 37 of the housing 31 via a seal member 70. The first valve plate portion 51*a* has (two are shown in FIG. 2) connecting holes 52 that penetrate the first valve plate portion 51*a* in the thickness direction, i.e., in the vertical direction. The connecting holes 52 are arranged around the shaft portion 51*b*. The shaft portion 51*b* is higher than the cylinder portion 51*c*.

A first spring 55 comprised of a coil spring is coaxially interposed between the first valve plate portion 51*a* and the cover 40. The first spring 55 biases the first valve plug 51 downward, i.e., in the closing direction. The lower end of the first spring 55 is positioned adjacent to the inner circumference of the cylinder portion 51*c* of the first valve plug 51.

The upper surface of the valve seat 37 and the lower surface of the first valve plate portion 51*a* of the first valve plug 51 are flat and face each other. The annular seal member 70 is attached to the lower surface of the first valve plate portion 51*a*. The seal member 70 will be described later.

The negative pressure relief valve 60 is installed in the housing 31 to be arranged coaxially with the positive pressure relief valve 50. The negative pressure relief valve 60 moves relatively to the first valve plate portion 51*a* of the first valve plug 51 as a valve seat in the axial direction, i.e., the vertical direction to be open and closed. The negative pressure relief valve 60 is normally closed. The negative pressure relief valve 60 opens when the pressure on the fuel tank 12 side is less than the valve opening pressure value for the negative pressure.

A second valve plug 61 of the negative pressure relief valve 60 has a second valve plate portion 61*a* and a hollow valve shaft portion 61*b* that are arranged coaxially. The second valve plate portion 61*a* has an annular plate shape. The valve shaft portion 61*b* protrudes from the inner circumference of the second valve plate portion 61*a*. The valve shaft portion 61*b* is arranged within the shaft portion 51*b* of the first valve plug 51 to be movable in the axial direction, i.e., the vertical direction. A spring receiving member 62 is attached to the upper end of the valve shaft portion 61*b* and has a ring plate shape.

The second valve plate portion 61*a* has an outer diameter smaller than the inner diameter of the first connecting port 34. When the second valve plug 61 is in a valve closed position, the second valve plate portion 61*a* seats on the first valve plate portion 51*a*, (more precisely, the portion surrounding the plurality of connecting holes 52) of the first valve plug 51 via the seal member 70.

A second spring 65 is a coil spring and coaxially interposed between the spring receiving member 62 and the first valve plate portion 51*a*. The lower end of the second spring 65 is disposed at a position surrounding the plurality of connecting holes 52 of the first valve plug 51. The second spring 65 biases the second valve plug 61 upward, i.e., in the closing direction. The second spring 65 has a biasing force weaker than that of the first spring 55.

Next, operations of the relief valve device 30 will be described. In the initial state, the sealing valve 14 of the fuel vapor emission control system 10 (see FIG. 1) is closed such that, as shown in FIG. 2, both relief valves 50 and 60 of the relief valve device 30 are closed. The first valve plate portion 51*a* of the first valve plug 51 seats on the valve seat 37 via the seal member 70 because of the biasing force of the first spring 55. Also, the second valve plate portion 61*a* of the second valve plug 61 seats on the first valve plug 51 via the seal member 70 because of the biasing force of the second spring 65. As a result, the fluid communication between the passage 33 and the first connecting port 34 is blocked.

Figure 3:
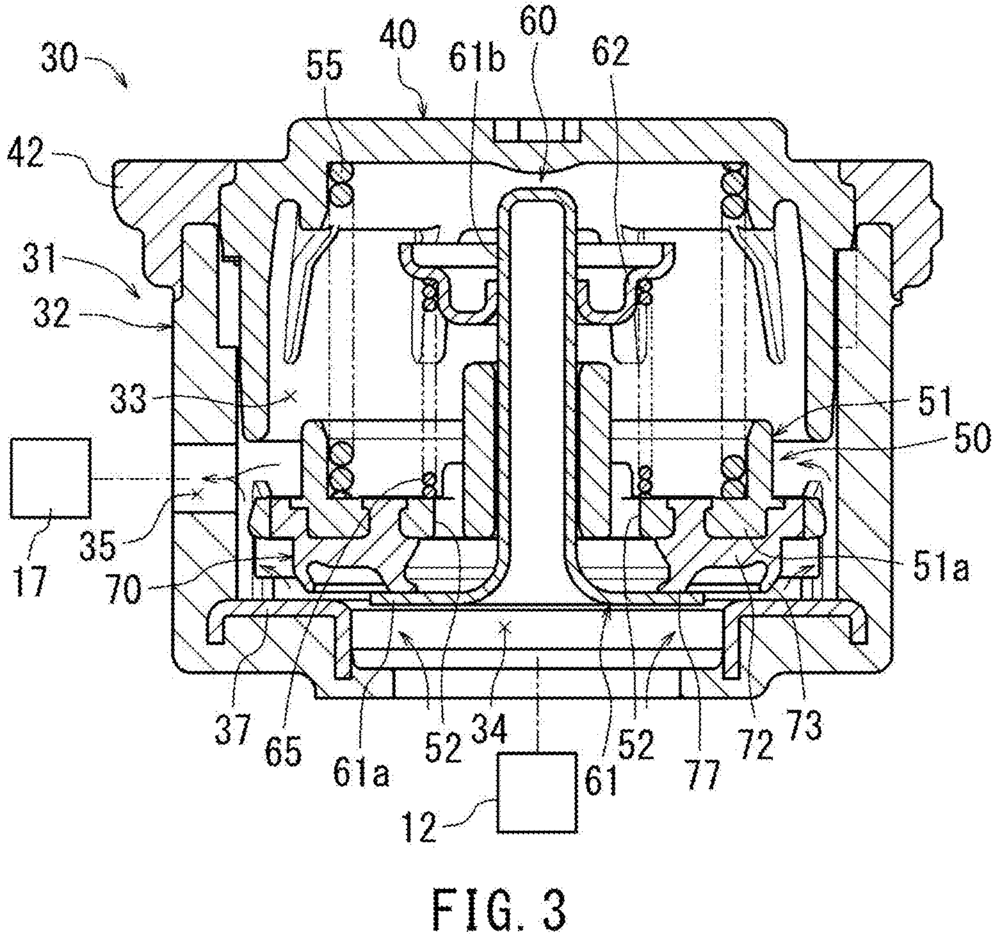
FIG. 3 is a cross-sectional view of the relief valve device of FIG. 2 to illustrate a positive pressure relief valve in an open state.

In this state, when a positive pressure generated on the fuel tank 12 side exceeds the valve opening pressure value, the positive pressure relief valve 50 is opened. As shown in FIG. 3, the first valve plug 51 moves upward against the biasing force of the first spring 55 to be in the valve open position. In this state, the seal member 70 leaves the valve seat 37 to connect the passage 33 to the first connecting port 34 such that the fluid flows from the fuel tank 12 side through passage 33 to the canister 17 side (see arrows in FIG. 3), therefore, reduces the pressure in the fuel tank 12.

Figure 4:
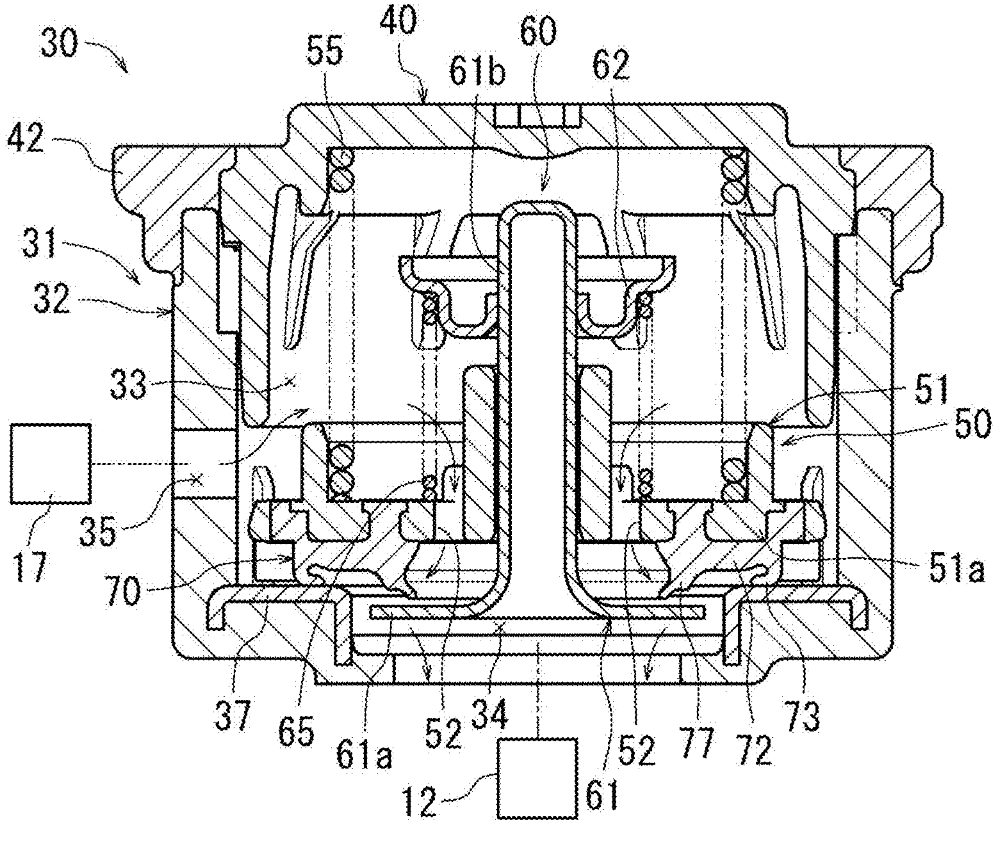
FIG. 4 is a cross-sectional view of the relief valve device of FIG. 2 to illustrate a negative pressure relief valve in an open state.

When a negative pressure generated on the fuel tank 12 side is lower than the valve opening pressure value of the negative pressure relief valve 60, the negative pressure relief valve 60 is opened. As shown in FIG. 4, the second valve plug 61 moves downward against the force of the second spring 65 to be in the valve open position. In this state, the second valve plate portion 61*a* of the second valve plug 61 leaves the seal member 70 to fluidly connect the passage 33 to the first connecting port 34 through the connecting holes 52. As a result, fluid flows from the canister 17 side to the fuel tank 12 side through the passage 33 including the connecting holes 52 (see arrows in FIG. 4). This increases the pressure in the fuel tank 12.

Figure 5:
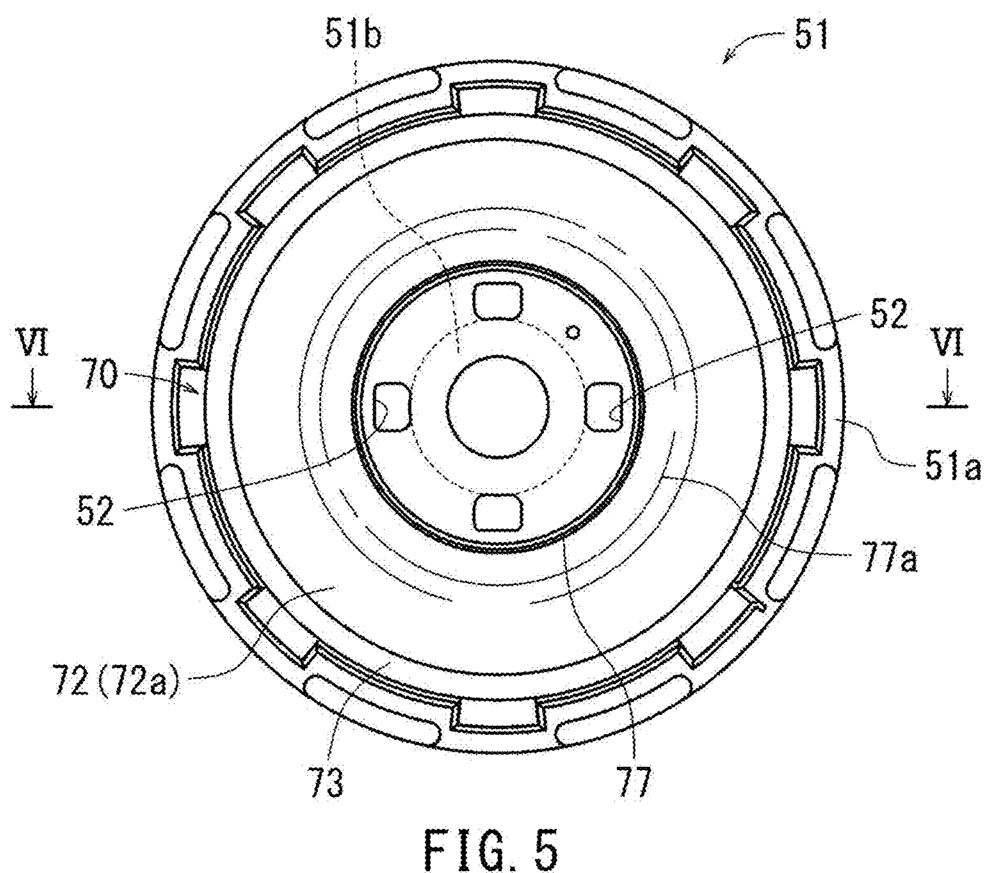
FIG. 5 is a bottom view of a first valve plug having a seal member.
Figure 6:
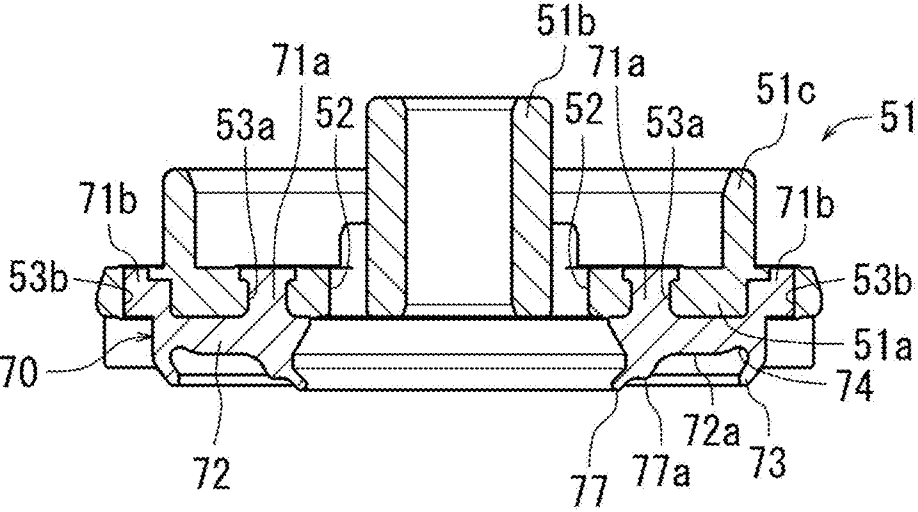
FIG. 6 is a cross-sectional view of the first valve plug along line VI-VI in FIG. 5.

Next, the seal member 70 will be described. FIG. 5 is a bottom view of the first valve plug 51 having the seal member 70. FIG. 6 is a cross-sectional view of the first valve plug 51 along line VI-VI in FIG. 5. As shown in FIG. 6, the seal member 70 is attached to the lower surface of the first valve plate portion 51*a* of the first valve plug 51 by integral molding. The seal member 70 is made of a rubber-like elastic material. The inner circumference of the upper surface of the seal member 70 has a plurality (two are shown in FIG. 6) of engagement portions 71*a* that engage a plurality (two are shown in FIG. 6) of engagement holes 53*a* formed in the first valve plate 51*a*. The outer circumference of the upper surface of the seal member 70 has a plurality (two are shown in FIG. 6) of engagement portions 71*b* that engage a plurality (two are shown in FIG. 6) of engagement holes 53*b* formed in the first valve plate 51*a*.

As shown in FIG. 6, the seal member 70 has a base portion 72, a first seal lip 73, and a second seal lip 77. The base portion 72 has an annular plate shape. The first seal lip 73 is formed on the outer periphery of the lower surface 72*a* of the base portion 72. The second seal lip 77 is formed on the inner periphery of the lower surface 72*a* of the base portion 72. The upper surface of the base portion 72 is attached to the lower surface of the first valve plate portion 51*a* of the first valve plug 51. The lower surface 72*a* of the base portion 72 is also referred to as a "surface" herein. The first seal lip 73 will be described after the second sealing lip 77.

The second seal lip 77 has a hollow circular truncated cone shape projecting obliquely inward in the axial direction from the inner circumference of the lower surface of the base portion 72. The outer circumference of the second seal lip 77 has a ring-shaped projection 77*a* having a triangular cross section.

When the second valve plug 61 is in the valve closed position (see FIG. 2), the second valve plate 61*a* elastically contacts, or adheres to, the tip of the second seal lip 77, including the protrusion 77*a*, of the seal member 70. As a result, the seal member 70 seals between the second valve plug 61 and the first valve plug 51. When the second valve plug 61 is in the valve open position (see FIG. 4), the second valve plate 61*a* leaves the second seal lip 77 of the seal member 70, thereby elastically restoring the second seal lip 77 to its original shape.

Figure 7:
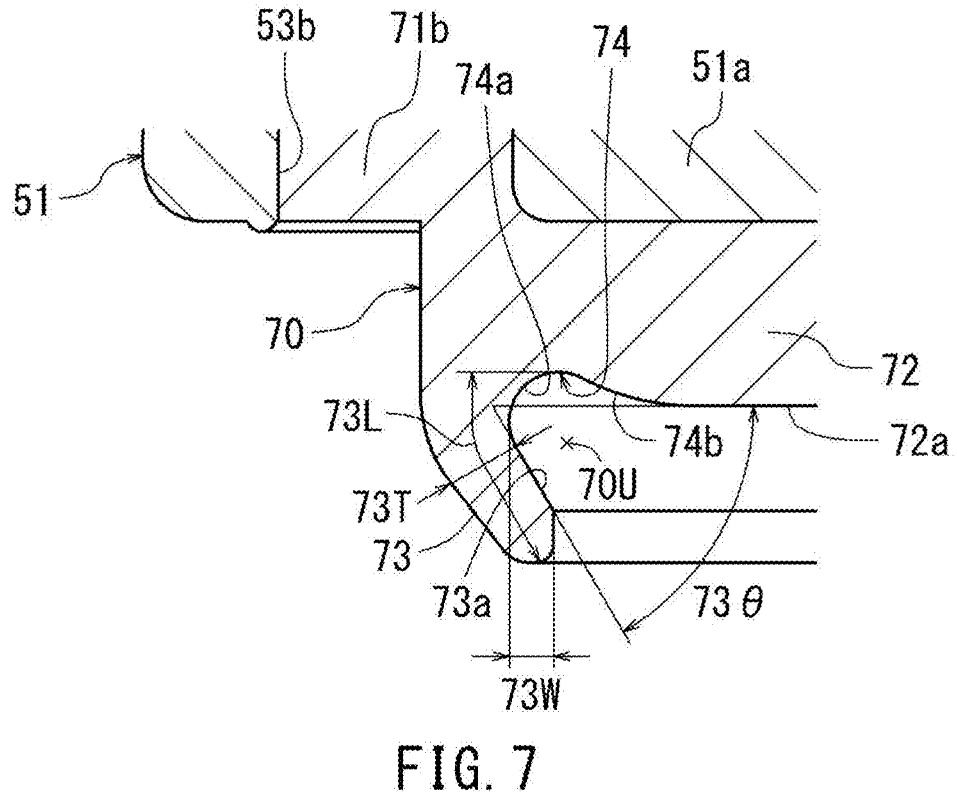
FIG. 7 is a cross-sectional view of a first seal lip of the first valve plug of FIG. 6.

FIG. 7 is a cross-sectional view of a portion of the first seal lip 73. As shown in FIG. 7, the first seal lip 73 has a hollow circular truncated cone shape protruding obliquely inwardly in the axial direction from the outer periphery of the lower surface of the base portion 72.

The first seal lip 73 is tapered in cross-section from the base end to the tip end. In other words, the wall thickness 73T of the first seal lip 73 decreases from the base side to the tip side. The tip of the first seal lip 73 is rounded.

The first seal lip 73 has an inner circumferential surface 73*a* that forms an acute angle with the lower surface 72*a* of the base portion 72. The angle between the lower surface 72*a* and the inner circumferential surface 73*a* is referred to as a lip angle 730. The first seal lip 73 has a lip center length 73L and a forcible ejection width 73W. The inner circumferential space of the first seal lip 73 is an undercut portion 70U for molding the seal member 70.

The lower surface 72*a* of the base portion 72 has a circular recess 74 extending continuously in the circumferential direction. The recess 74 has an inner surface is continuous with the inner circumferential surface 73*a* of the first seal lip 73. The inner surface of the recess 74 has a concave curved surface 74*a* having an arcuate cross-section. The concave curved surface 74*a* is smoothly continuous with the inner circumferential surface 73*a* of the first seal lip 73. A convex curved surface 74*b* having an arcuate cross-section smoothly connect the concave curved surface 74*a* with the lower surface 72*a* of the base portion 72.

Figure 8:
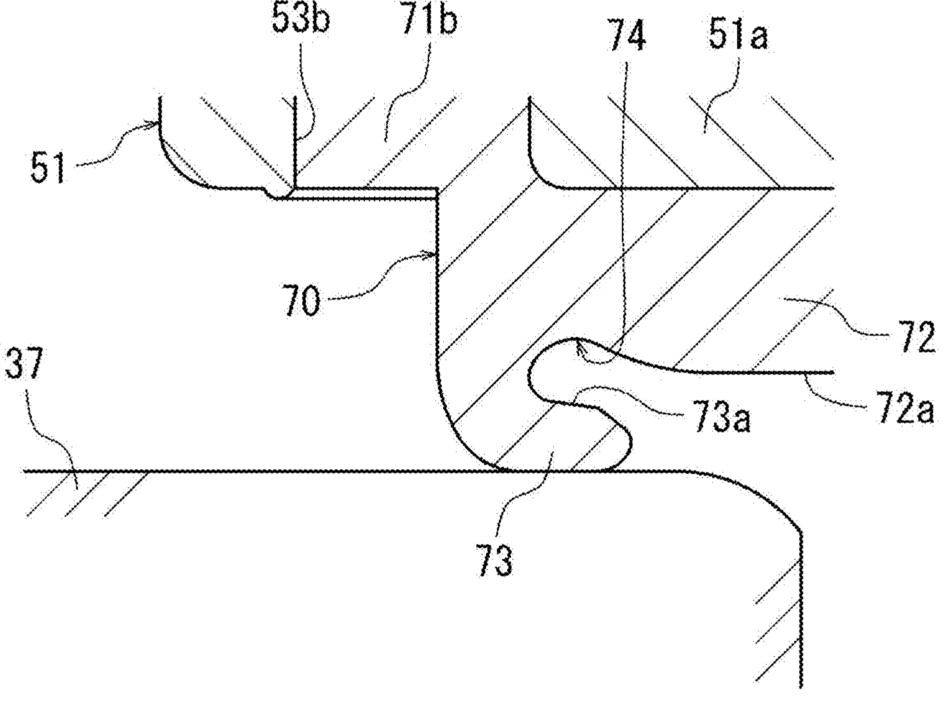
FIG. 8 is a cross-sectional view of the first seal lip of FIG. 7 in a closed state.

As shown in FIG. 8, when the first valve plug 51 is in the valve closed position, the tip of the first seal lip 73 elastically contacts, or adheres to, the upper surface of the valve seat 37. In this state, the first seal lip 73 elastically deforms to bend inward in the radial direction and upward. Therefore, the seal member 70 seals between the first valve plug 51 and the valve seat 37. When the first valve plug 51 is in the valve open position, the first seal lip 73 is separated from the valve seat 37 causing the first seal lip 73 to be elastically restored to its original shape (see FIG. 7).

Figure 9:
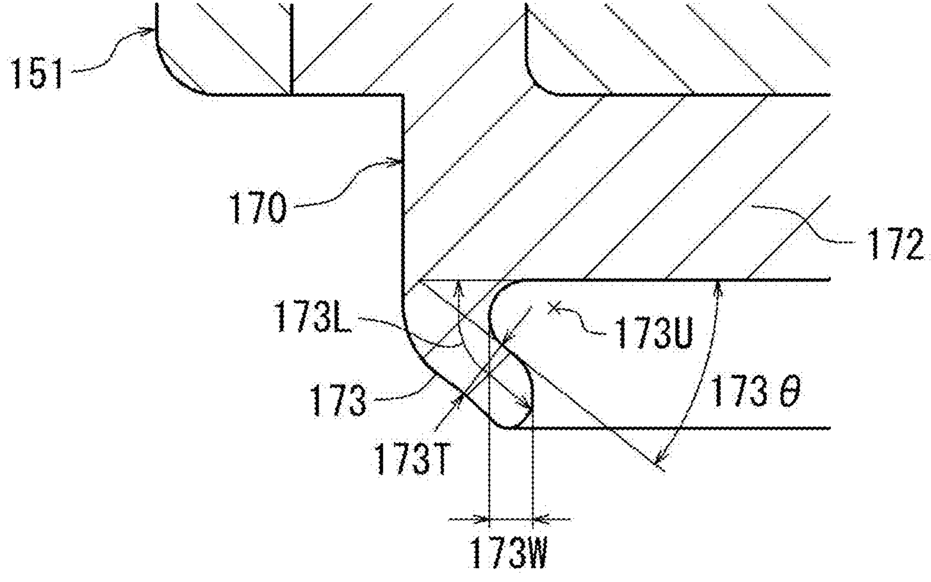
FIG. 9 is a cross-sectional view of a seal member of an existing flow control valve.

According to the present embodiment, the lower surface 72*a* of the base portion 72 of the seal member 70 of the positive pressure relief valve 50 defines the undercut portion 70U and has the circular recess 74. The recess 74 continuously extends in the circumferential direction and has the inner wall continuous with the inner circumferential surface 73*a* of the first seal lip 73. Therefore, compared to the lip center length 173L of the seal lip 173 of the existing flow control valve (see FIG. 9), the lip center length 73L of the first seal lip 73 is extended by an amount equivalent to the depth of the recess 74, thereby improving the flexibility, or pliability, of the first seal lip 73. This can improve mold release during molding of the seal member 70.

The first seal lip 73 is tapered in cross-section from the base end to the tip end. This further improves the mold release property during molding of the seal member 70. The wall thickness 73T at the tip of the first seal lip 73 is substantially equivalent to the wall thickness 173T of the seal lip 173 of the existing flow control valve (see FIG. 9) and gradually increases toward the base end. Therefore, compared to the seal lip 173 of the existing flow control valve, the flexibility, or flexibility, of the tip side of the first seal lip 73 can be improved while increasing the elasticity of the base side of the first seal lip 73.

The lip angle 730 of the first seal lip 73 is set to be larger than the lip angle 1730 of the seal lip 173 of the existing flow control valve (see FIG. 9) by about 20 degrees. This configuration can effectively improve mold release during molding of the seal member 70.

The forcible ejection width 73W of the first seal lip 73 is set slightly smaller than the forcible ejection width 173W of the seal lip 173 of the existing flow control valve. This configuration can effectively improve mold release during molding of the seal member 70.

The inner wall of the recess 74 has the concave curved surface 74*a*, which is circular arc-shaped in cross-section and smoothly continuous with the inner circumferential surface 73*a* of the first seal lip 73. This can disperse stress when the first seal lip 73 is deformed, thereby suppressing deterioration of the first seal lip 73.

The convex curved surface 74*b* having an arc-shaped cross-section smoothly connects the inner wall of the recess 74 to the lower surface 72*a* of the base portion 72. This can disperse stress when the first seal lip 73 is deformed, thereby suppressing deterioration of the first seal lip 73.

The present disclosure is not limited to the embodiments described above and can modified without departing from the gist of the disclosure. Furthermore, the features of this disclosure can be performed alone or in any combination. For example, the technology disclosed herein is not limited to the positive pressure relief valve 50 of the fuel vapor emission control system 10 and may be applied to the negative pressure relief valve 60 or relief valves of other devices. The portion of the seal member 70 including the first seal lip 73 may be attached to the valve seat 37 instead of the first valve plug 51. The base portion 72 of the seal member 70 may be attached to the first valve plate portion 51*a* of the first valve plug 51 by adhesion, welding, or the like. The cross-sectional shape of the recess 74 of the seal member 70 may be changed as needed.

The present disclosure includes various aspects below. In a first aspect, a flow control valve includes a housing defining a fluid passage, a valve seat having a ring shape and disposed in the housing, a valve plug movable relative to the valve seat between a valve open position and a valve closed position in an axial direction of the valve seat, and a seal member interposed between the valve seat and the valve plug. The seal member has a ring shape and is configured to seal between the valve seat and the valve plug when the valve plug is in the valve closed position. The seal member includes an annular base portion attached to one of the valve seat and the valve plug, and a seal lip having a circular truncated cone shape and protruding obliquely inward in the axial direction from a surface of the base portion. The seal lip is separated from the other of the valve seat and the valve plug when the valve plug is in the valve open position and elastically contacts the other of the valve seat and the valve plug when the valve plug is in the valve closed position. The surface of the base portion has a circular recess extending continuously in a circumferential direction and having an inner surface continuous with an inner circumferential surface of the seal lip.

In accordance with the first aspect, the circular recess having the inner surface continuous with the inner circumferential surface of the seal lip and continuous in the circumferential direction is formed on the surface of the base portion of the seal member having an undercut portion. Therefore, the lip center length of the seal lip is extended by the depth of the recess, which improves the flexibility of the seal lip. This can improve the mold release property of the seal member during molding.

A second aspect is the flow control valve of the first aspect, wherein the seal lip is tapered in cross-section from a base end to a tip end of the seal lip.

In accordance with the second aspect, mold release during molding of the seal member can be further improved.

A third aspect is the flow control valve of the first or second aspect, wherein the inner surface of the recess includes a concave curved surface having an arcuate cross section. The concave curved surface is smoothly continuous with the inner circumferential surface of the seal lip.

In accordance with the third aspect, the stresses caused by deformation of the seal lip can be dispersed, thereby suppressing the deterioration of the seal lip.

A fourth aspect is the flow control valve of the first aspect, wherein the seal member includes a convex curved surface having an arcuate cross-section. The convex curved surface smoothly connects the concave curved surface to the surface of the base portion.

In accordance with the fourth aspect, the stresses caused by deformation of the seal lip can be dispersed, thereby suppressing the deterioration of the seal lip.

What is claimed is:

1. A flow control valve comprising:

a housing defining a fluid passage, a valve seat having a ring shape and being disposed in the housing, a valve plug movable relatively to the valve seat between a valve open position and a valve closed position in an axial direction of the valve seat, and a seal member interposed between the valve seat and the valve plug, wherein the seal member has a ring shape and is configured to seal between the valve seat and the valve plug when the valve plug is in the valve closed position, wherein the seal member further comprises an annular base portion attached to one of the valve seat and the valve plug, and a seal lip having a circular truncated cone shape and protruding obliquely inward in the axial direction from a surface of the base portion, wherein the seal lip is configured to be separated from the other of the valve seat and the valve plug when the valve plug is in the valve open position, wherein the seal lip is configured to elastically contact the other of the valve seat and the valve plug when the valve plug is in the valve closed position, wherein the surface of the base portion has a circular recess extending continuously in a circumferential direction and having an inner surface continuous with an inner circumferential surface of the seal lip, wherein the inner surface of the recess comprises a concave curved surface having an arcuate cross section, wherein the concave curved surface is smoothly continuous with the inner circumferential surface of the seal lip, wherein the seal member comprises a convex curved surface having an arcuate cross-section, and wherein the convex curved surface smoothly connects the concave curved surface to the surface of the base portion.

2. The flow control valve of claim 1, wherein the seal lip is tapered in cross-section from a base end to a tip end of the seal lip.

* * * * *